United States Patent [19]

Kosarek

[11] 4,361,471
[45] Nov. 30, 1982

[54] ELECTROLYTIC SWIMMING POOL CHLORINATION

[76] Inventor: Louis J. Kosarek, 321 Arboles Dr., El Paso, Tex. 79932

[21] Appl. No.: 162,132

[22] Filed: Jun. 23, 1980

[51] Int. Cl.³ .......................... C25B 1/26; C02F 1/46; C25B 11/02; C25B 15/08
[52] U.S. Cl. ..................... 204/128; 204/149; 204/151; 204/265; 204/266; 204/277; 204/278; 204/288
[58] Field of Search .................. 204/128, 149–151, 204/257–258, 262, 265–266, 269–270, 277–278, 292, 294, 274, 288, 98

[56] References Cited

U.S. PATENT DOCUMENTS

| | | | |
|---|---|---|---|
| 1,746,542 | 2/1930 | Low | 204/128 |
| 1,913,429 | 6/1933 | Crawford | 204/277 |
| 3,623,970 | 11/1971 | Haas | 204/266 X |
| 3,793,163 | 2/1974 | Dotson | 204/128 X |
| 3,917,521 | 11/1975 | Clarke et al. | 204/149 |
| 4,097,356 | 6/1978 | Yates | 204/266 X |
| 4,229,272 | 10/1980 | Yates | 204/128 |

*Primary Examiner*—Delbert E. Gantz
*Assistant Examiner*—Donald R. Valentine
*Attorney, Agent, or Firm*—Hill, Van Santen, Steadman, Chiara & Simpson

[57] ABSTRACT

An open-cell electrolyte chlorine generator such as a type used for the chlorination of various aqueous streams including swimming pools is constructed without the use of a diaphragm or membrane isolating or partitioning the electrolyte between the anode and cathode. Instead, a gas separating plate separates the electrolyte above horizontally projecting electrodes, in order to keep the different gasses generated at the different electrodes separated as they rise to the top of the cell. Aqueous buffering reagents are added to the chloride-containing electrolyte to neutralize the hydroxide anions generated at the cathode and to optimize the evolution of chlorine gas by stabilizing the pH of the electrolyte. The chlorine and hydrogen gasses produced may be separately added to the solution which is to be treated, with an optional cooling circuit taking the pre-treated solution and passing it through the cell (in heat-exchanging tubing) prior to treatment with the gasses. Thus during much of the operation of the cell, only the desired product (chlorine gas) and the easily disposed of hydrogen gas must be removed from the cell.

21 Claims, 4 Drawing Figures

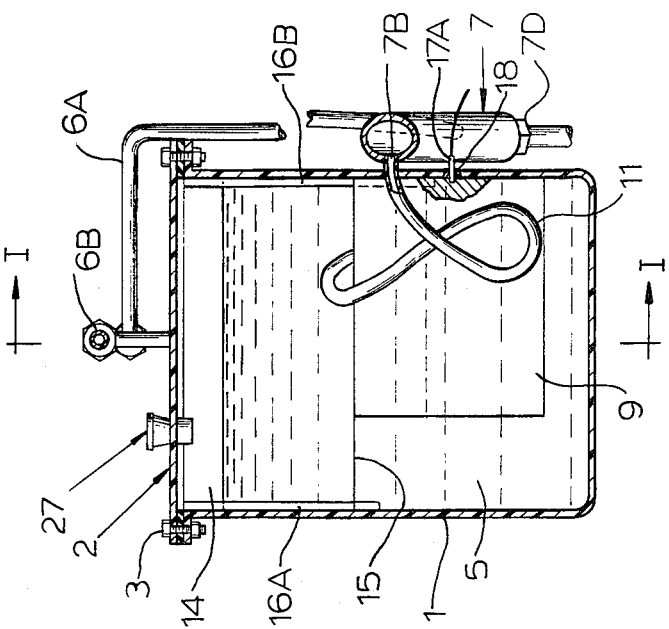

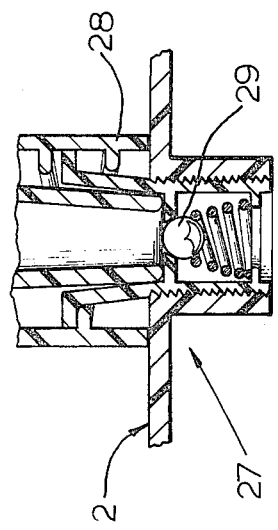
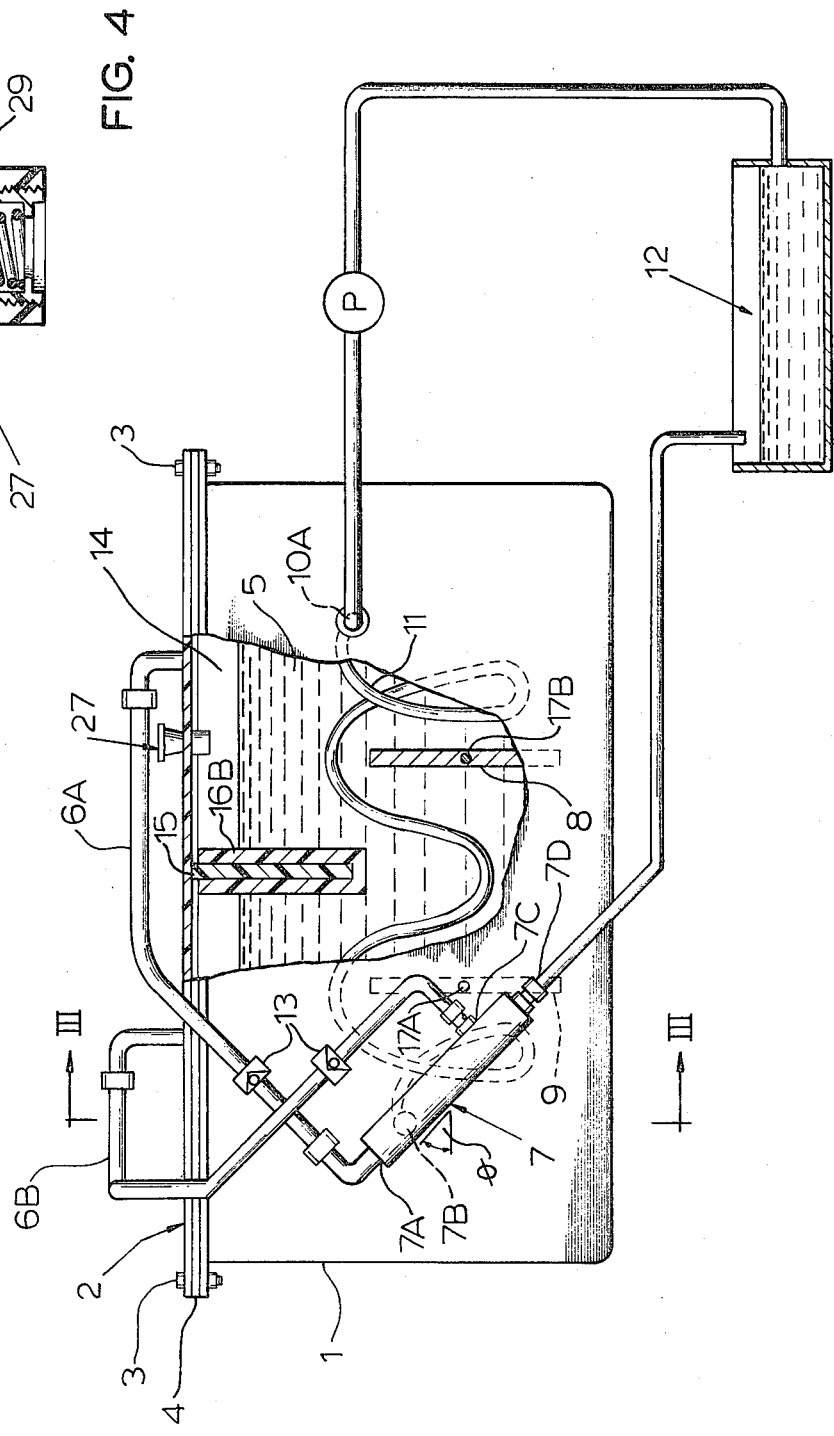

ELECTROLYTIC SWIMMING POOL CHLORINATION

BACKGROUND OF THE INVENTION

1. Field of the Invention

The present invention relates to a chlor-alkali cell, and more particularly to a chlorine gas generator unit for on-site usage of the chlorine gas as a disinfectant within swimming pools or other aquatic apparatus involving the storage and recycling of water.

2. Description of the Prior Art

There are several methods of treating water to kill living organisms, particularly pathogenic bateria. The application of chlorine or chlorine compounds is the most common, although less frequently used methods include the use of ultraviolet light, ozone, or silver ions.

For large systems, chlorine gas is the most economical and easiest to apply. It is typically handled in liquid form in pressurized tanks, and introduced either directly into the receiving water through diffusers, or by first being dissolved into a separate stream which is then discharged into the receiving water.

For emergency uses, or where water consumption is small and the chemical cost is of no significance, hypochlorination is employed. Hypochlorination used calcium or sodium hypochlorite as the disinfectant, the former being a solid and the latter, a solution. Although the equipment required for handling the hypochlorites is less expensive than that necessary for free chlorine, the cost of the chemicals is greater.

A further application technique involving treatment with chlorine gas utilizes a chlorine gas generator for the on-site production of the gas. There are several methods of obtaining chlorine gas, and most of them involve the electrolysis of a chlor-alkali solution.

The nascent electrolytic production of chlorine gas from an electrically conducting solution which contains chloride is facilitated by applying a current across a submerged positively charged anode. The electrolyte will also contain a negatively charged cathode to complete the circuit. The chloride anions present within the electrolyte are oxidized to produce chlorine gas. An energy source of direct current or of a rectified alternating current is used to provide the necessary electrical potential.

Parallel with the production of chlorine gas at the anode, cationic hydronium ions present from dissociated water are reduced at the negatively charged cathode and result in the generation of hydrogen gas. As the water is dissociated into the components of hydronium cations and hydroxide anions, and with the further transformation of hydronium ions into hydrogen gas, there is the ensuing production of an aqueous caustic or hydroxide solution at the cathode.

The electrode used in the generation of chlorine gas, (the anode), and the electrode used in the generation of hydrogen gas and resultantly hydroxide, (the cathode), can be either dimensionally stable or non-dimensionally stable. A dimensionally stable electrode, one that does not wear away with use, can consist of the following: titanium oxide and ruthenium oxide coated substrates (U.S. Pat. No. 3,963,593), a plantinized titanium material (U.S. Pat. No. 3,963,592), the silicade of platinum group metals (U.S. Pat. No. 3,963,593), a boride of either titanium, tantalum, zirconium, aluminum, hafnium, niobium, tungsten, yttrium, molybdenum, or vanadium (U.S. Pat. Nos. 4,111,765, 4,055,477), a substrate coated with the oxide of hafnium (U.S. Pat. No. 4,012,296), a bronze substrate coated with platinum, irridium, rhodium, palladium, ruthenium, or osmium (U.S. Pat. No. 4,032,417), cobalt spinels (U.S. Pat. No. 4,061,549), yttrium oxide matrix (U.S. Pat. No. 4,098,669), titanium or tantalum substrate coated with platinum and doped with the oxide of either silver, tine, chromium, lanthanum, cobalt, antimony, molybdenum, nickel, iron, tungsten, vanadium, phosphorus, boron, beryllium, sodium, calcium, strontium, lead, copper, or bismuth (U.S. Pat. Nos. 4,070,504, 3,986,942), a lanthanum substrate with a pervoskite surface (U.S. Pat. No. 4,076,611), or a substrate coated with platinum or a noble metal alloy or oxide (U.S. Pat. No. 4,100,050), gold, or treated graphite. The nondimentionally stable anodes are constructed of rods of steel or of graphite carbon (U.S. Pat. No. 4,097,356).

Concurrent with the nascent generation of chlorine gas from chloride solutions, the cathode is usually dimensionally stable and can be constructed of such materials as: a ferrous substrate coated with either tungsten, cobalt, nickel or phosphorus (U.S. Pat. Nos. 4,010,085, 4,086,149), metal carbides, borides, nitrides and sulfides (U.S. Pat. No. 4,098,669), a copper substrate with a coating of nickel, vanadium or molybdenum (U.S. Pat. No. 4,033,837), high surface-area nickel coated steel (see, Chemical Engineering, 87(3):106 (1980), graphite, or stainless steel. The materials of which the cathodes and anodes are fabricated cannot consist of the same material as this will cause excessive electrode wear.

The apparatus used to electrolytically generate chlorine gas, hydrogen gas, and the residual hydroxide solution is termed a "Chlor-alkali cell" (see, Chemical Engineering, 85(16):106 (1978). The three types of chlor-alkali cells are: the mercury amalgam cell, the asbestos diaphragm cell, and the membrane cell. The inherent design of chlor-alkali cell is established on the basis of optimizing the generation of chlorine gas, generating a relatively pure solution of hyroxide (caustic) exclusive of chlorides, minimizing the conversion of chlorine gas to chlorine oxides, and maintaining a separation of chlorine and hydrogen gasses to minimize the loss of chlorine gas via chemical reaction to hydrochloric gas. The separation of the anode compartment-anolyte, and the cathode compartment-catholyte can optimize these operating conditions. This separation has been achieved by chemical and physical means using, respectively, physiochemical solubility or a physical barrier.

The amalgam used in the mercury cell is a free flowing cathode which is relatively insoluble within the solution of the cell and is withdrawn from the cell as a reduced sodium mercury compound (U.S. Pat. No. 3,793,164). The chlorine gas is generated from an anode and the hydroxide and hydrogen gas are generated by combining water with the withdrawn, reduced analgam. The anolyte solution containing the chlorides is separated from the free flowing catholyte by the use of solubility physiochemistry.

The diaphragm which is used to partition a diaphragm cell divides the anolyte and catholyte and retains a cation-permeable nature such that anions such as hydroxide cannot diffuse from the cathode to the anode. This diffusion would result in the formation of chlorine oxides, and loss of hydroxide concentration. The diaphragm partition (U.S. Pat. Nos. 4,121,990, 4,013,525) used in chlor-alkali cells may consist of: a vacuum deposited asbestos species such as crocidotite or chrysolite (U.S. Pat. No. 4,093,533); a synthetic diaphragm of fluorocarbon resins (U.S. Pat. Nos. 3,853,720, 4,118,308); polymeric resins (U.S. Pat. No. 3,775,272); a carbon diaphragm (U.S. Pat. No. 3,223,242); a diaphragm consisting of sand placed with polyarylene sulfide binders (U.S. Pat. No. 4,080,270); chlorotrifluoroethylene fiber materials (U.S. Pat. Nos. 4,126,535, 4,126,536); an ion-exchange membrane with a graft copolymer of polyolefins and hydroxystyrene (U.S. Pat. Nos. 4,025,401, 4,011,147); an asbestos diaphragm composed of sulfonated or halogenated copolymers of styrene and divinyl benzene (U.S. Pat. No. 4,056,447); a ceramic partition with a coating of either $Sb_2O_5$, $Bi_2O_5$, $MoO_3$, $WO_3$, or $V_2O_5$ (U.S. Pat. No. 4,119,507), placed on the anode side; or abestos doped with ethylene chlorotrifluoroethylene (Halar) binders (see, Chemical Engineering, 81(4):84 (1974).

An advanced means of compartmentalizing the electrolytic unit which generates chlorine gas, hydrogen gas, and hydroxide is by use of a membrane partition. In the membrane cell the anolyte and catholyte are segregated using a synthetic microporous copolymer which is permselective, hydraulically impermeable, and utilizes inherent anionic characteristics to inhibit the migration of hydroxide ions from the cathode to the anode by repulsion due to like charges. (U.S. Pat. Nos. 4,069,128, 3,773,634, 4,075,068, 3,117,066, 4,080,270, 4,025,405, 4,057,474, 4,111,780, 4,036,714, 4,055,476, 4,056,448). The membrane materials used to conduct a charge yet limit the movement of the hydroxide ions in the chlor-alkali cell consist of: copolymers of divinyl benzene and olefinic carboxylic acids (U.S. Pat. No. 2,731,408); polymerized perfluorosulfonic acid-DuPont's Nafion series (U.S. Pat. Nos. 4,030,988, 4,021,327, 4,056,448, 4,085,071); a polymer of perfluorinated hydrocarbons with side chains of sulfonated perfluorovinyl ether and sulfostyrenated perflourinated ethylene (U.S. Pat. Nos. 4,061,550, 4,062,743); copolymers of perfluoroalkyl or trifluoromethyl subgroups (U.S. Pat. No. 4,080,270); a copolymer of tetrafluoroethylene and sulfonated perfluorovinyl ether (U.S. Pat. Nos. 3,948,737, 3,951,766); and a perflourocarboxylic acid ion-exchange material (Asahi Chemical Industry Co.). These membranes are stable, cationic-permeable derivatives which are electrically conductive. ("Perfluorinated Ion Exchange Membrane", W. T. F. Grot et al. Presented to the 141st National Meeting of the Electrochemical Society in Houston, Texas, May 7–11, 1972; Asahi Chemical Industry Co., 1-2, 1 Chome, Yurakucho, Chiyoda-ku, Tokyo, Japan).

In the operational application of the membrane cell, various constituents such as precipitated compounds, electrode debris, and suspended solids in the make-up water, tend to plug the membranes and render them inoperable or significantly decrease conductive capacities, resulting in an excessively inefficient electrolytic cell. The methods which are utilized to alleviate this problem of a plugged membrane include: the use of phosphate type additives in the cell which form a pH controlled insoluble gel above pH 5.5 (U.S. Pat. No. 3,793,163); the use of chelation via ethylenediaminetetraacetic acid (EDTA); propyleneglycol, or dextrose (U.S. Pat. No. 3,971,706); the intermittent use of acids (U.S. Pat. No. 4,040,919); an intermittent cell pH of 3 to 5 (U.S. Pat. Nos. 3,948,737, 4,055,475); and a specific method of regenerating perfluorocarboxylic acid membranes (U.S. Pat. No. 4,115,240).

An additional problem associated with the use of a membrane in the chlor-alkali cell is physical stress due to high temperatures, the presence of chlorine (an oxidizing environment), and swelling of the membrane from water hydration. These difficulties result in the stretching, shrinking and, warping of the membrane such that the membrane under these conditions causes electromotive shorts and result in an inefficient cell. Hence, to circumvent the deleterious membrane alterations which occur during the operation of a chlor-alkali cell, a method of pre-treatment and pre-processing was devised (U.S. Pat. No. 3,985,631).

In order for a chlor-alkali cell to generate chlorine gas, a source of chlorides must be present in the anolyte which, when oxidized, forms chlorine gas. The most common sources of chlorides used in the electrolyte are sodium chloride (table salt), which is granulated or in the form of rock salt (U.S. Pat. Nos. 3,933,603, 3,773,634, 4,025,405, 4,056,448), or hydrochloric acid (U.S. Pat. Nos. 3,117,066, 3,351,542). In any event, a source of anionic chloride must be provided for the generation of chlorine gas, and the source of chlorides can actually be provided from any one of numerous chloride salts (U.S. Pat. No. 3,361,663).

A by-product of the chlor-alkali cell, which is at times undesireable, is hydrogen gas. Within certain types of electrolytic chlorine gas units, where the generated hydrogen is neither released (vented) to the air nor dissipated in an aqueous body, this possibly explosive gas must be reacted to minimize any potential hazard. The means which has been applied to oxidize this hydrogen gas has been the use of oxygen or air (U.S. Pat. Nos. 3,291,708, B 361,744, 3,941,667, 4,035,254, 4,035,255, 4,121,990) directly within the cell or within an additional piece of equipment.

Most chlor-alkali cells consist of two compartments, namely the anolyte for chlorine generation and the catholyte for hydroxide and hydrogen gas generation. Several recent designs incorporate a third compartment between the anolyte and catholyte and this "buffer compartment", as it is named, is the point of addition of the electrolyte chemicals and water (U.S. Pat. Nos. 3,954,579, 3,959,095, 4,061,550, 4,075,068). The buffer compartment is defined by a cation- and an anion-permeable membrane, with the purpose of this neutral compartment being to retain the production of high quality caustic in the catholyte and optimize the production of chlorine gas from the anolyte.

The placement of the electrodes within the chlor-alkali cell varies with the design of the unit and its application in the industrial or consumer sectors. The distance between electrodes is a function of design. It is arbitrary whether the electrodes are placed vertically (U.S. Pat. No. 4,100,050) or horizontally (U.S. Pat. No. 3,976,550) and this choice has previously not been a functional parameter. With a current applied across the anode and cathode within a conducting solution, the unit will increase in temperature such that depending on design, a separate heat exchanger may be required (U.S. Pat. No. 3,669,857).

Within the general sector of the application of chlor-alkali cells focussing on the generation of chlorine gas, there exists a division of on-site application which utilize the generated chlorine gas as a disinfectant when mixed with water. The active biocide is hypochlorous acid. These on-site chlorine generating units retain certain additional design modifications which facilitate operation and convenience.

One of these divisions in the use of the chlor-alkali cell is the use of the chlorine generator within swimming pool applications. Several varieties of swimming pool chlorine generators exist and include: the direct addition of salt to the pool water and the passing of this saline pool water over an anode and cathode within a non-partitioned electrolytic unit (U.S. Pat. Nos. 2,887,444, 3,378,479); the generation of chlorine with a non-partitioned cell using a hydrochloric acid electrolyte and the subsequent addition of the electrolyte directly to the swimming pool for chlorination and pH control purposes (U.S. Pat. No. 3,351,542); the generation of a chlorine gas and hypochlorous acid anolyte solution from a sodium chloride electrolyte using a membrane cell with the direct application of the anolyte to the pool for disinfection purposes and the altered addition of the caustic solution to either the pool or to drain for pH control of the pool (U.S. Pat. No. 3,669,857); and the generation of chlorine gas using a conventional type membrane cell with the chlorine gas administered using an aspirator mixing unit to combine the chlorine gas with the pool water plus retaining a means to continuously withdraw abrasive caustic from the unit (U.S. Pat. No. 4,097,356).

In addition to the application of the on-site generation of chlorine gas for swimming pools disinfection, a variety of chemical treatments have been administered to the pool water to optimize the effectiveness of the available chlorine present in the pool. These means are aimed at controlling the alkalinity, acidity and hence pH of the pool. These means include the administration of buffering chemicals to the pool water such as tripolyphosphate, sodium biborate, sodium dibasic phosphate, sodium pyrophosphate, and sodium hexametaphosphate to facilitate pH control (U.S. Pat. No. 2,887,444), or the use of solid chemicals such as calcium carbonate within the chlorinated stream to control pH (U.S. Pat. No. 3,361,663) with the subsequent addition of calcium hardness and bicarbonate alkalinity to the pool water.

By utilization of the present invention, the on-site nascent generation of chlorine gas in swimming pool disinfection is possible such that the sole addition of chlorine gas is provided without the withdrawal of corrosive, potentially hazardous materials such as caustic from the electrolytic unit and without the administration of additional chemicals to the pool water. Additionally, no central membrane is required, thus avoiding the inevitable problem of membrane foul-out. As is hereinafter disclosed, the present invention retains a closed electrolytic chlorine generator which does not continuously generate abrasive caustic solutions, does not require a membrane, nor does it require other chemical additives to be placed directly into the swimming pool.

SUMMARY OF THE INVENTION

A simplified means of electrolytically producing chlorine gas to be used for disinfection purposes within swimming pools and other purposes has been achieved by the present invention. This simplified electrolytic chlorine gas generator incorporates an open-cell design without a diaphragm membrane or partition between the anode and cathode within the electrolyte. A specific reagent or reagents are used to buffer the electrolyte such that the hydroxide which is generated concurrent with chlorine gas is neutralized into water and an environment is maintained which optimizes the generation of chlorine gas.

The hereinafter discussed buffering chemistry is uniquely applied, to: (1) maintain chlorine gas generation; (2) minimize the corrosive nature of the electrolyte; (3) increase the longevity of the anode; (4) minimize corrosion of the cathode; (5) eliminate scaling of the housing or electrodes; and (6) eliminate the formation of chlorine oxides. In addition, formulations of electrolyte buffers are cited because of their desired effect in solublizing other buffering agents. The additional purpose of these buffering reagents and formulations is to minimize the stringent requirements associated with the use of a housing constructed of synthetic polymers.

The application of buffers as cited herein also circumvents the potentially dangerous situation of withdrawing hydroxide solution from the electrolytic unit and minimizes the dangerous aspects of such required activities. The use of these buffers also optimizes operating economic parameters because no chlorides are wasted by caustic removal and hence are not required to be replenished in the electrolyte. The only chlorides which are required to be added are those which are oxidized to chlorine gas and are withdrawn as a gas for disinfection purposes.

The chlorine and hydrogen gasses which are generated within the open-cell electrolytic swimming pool chlorine gas generator are conducted from the top of the unit via tubing constructed of compatable materials. This conductive tubing retains a set of check valves which allow only one way flow of the gas while not allowing any of the pool water to enter into the electrolyte unit. The gasses are then conducted via additional tubing of compatable materials to an injection point where the gases are administered to the swimming pool water. The pool water is mixed with only the chlorine and hydrogen gasses, no other chemicals or materials need be added to the pool water.

The nature of the gas injector is very simple with the gas being forced, by design parameters, to be mixed with the pool water in such a fashion that the chlorine gas is mixed first to form the disinfectant hypochlorite, which is then followed by the mixing of the chlorinated pool water with the hydrogen gas, to be later dissipated from the surface of the swimming pool. An important design consideration in this regard is the avoidance of mixing the concentrated chlorine and hydrogen gasses, which would result in the undesireable consumption of chlorine gas in producing hydrochloric gas. To facilitate this separation, a gas separating plate is employed. This gas separating plate is placed above the anode and cathode at the top of the electrolyte to segregate gasses, but it does not partition the electrolyte.

When desired, an electrolyte cooling circuit may be provided as an intricate part of the gas injection system. The electrolyte cooling circuit consists of tubing, constructed of compatable materials, which conducts swimming pool water, by means of the pump associated with the pool filter, within the tubing which cools the electrolyte within the chlorine gas generator. The reason for cooling the electrolyte unit is to optimize the longevity of the electrodes and housing, and to optimize the generation of chlorine gas. This cooling circuit concurrently heats up the pool water which is present at a temperature below 85° F. The cooling circuit then enters the gas injector, providing a means for the pool water to enter the gas injector. The cooling circuit is contained within the housing of the electrolytic unit while the gas injector and pool water hook-up conduit are external to the chlorine gas generator. However, except for such uses as require the passage through the electrodes of a heavy electrical current over an extended period of time, the above-described cooling circuit is not necessary for the proper functioning of the present invention as it is used in the vast majority of the invisioned applications.

To facilitate the separation of hydrogen and chlorine gasses within the open-cell electrolytic chlorinator, specially designed electrodes are implemented to direct the gasses towards the exit ports. These rectangular electrodes are horizontally mounted and are designed to allow the accumulated gasses on the electrodes to rise in such fashion as to be in a concentrated stream and bubble from the electrolyte more efficiently. Using these horizontally mounted rectangular electrodes optimizes the segregation of gasses within the electrolyte and minimizes the generation of hydrochloric gas from the reaction of the chlorine and hydrogen gasses.

This unique design in combination with the gas separating plate facilitates the highly efficient evolution of chlorine gas on the anode side of the electrolytic gas chlorine generator in the open-cell unit. By this efficient means of chlorine gas generation, relatively pure chlorine gas is conducted from the anode side of the electrolytic unit to the gas injector and the formation of hypochlorites in the pool water is optimized prior to hydrogen gas injection into the swimming pool water. Subsequently, hydrogen gas containing very minute quantities of chlorine gas is conducted to the hydrogen gas injector for later dissipation from the pool water without the inefficient formation of hydrochloric gas. In essence, the design of the open-cell electrolytic swimming pool chlorine gas generator using a buffering solution within the electrolyte literally separates the anode and cathode compartments without the use of a diaphram, membrane, or electrolyte partition.

In order to facilitate safety regarding the general use of this uniquely designed swimming pool gas chlorinator, a unique buffering addition and salt addition port is included at the top of the unit on the anode side of the chlorine gas generator. The fitting required for chemical additions such as buffer solution, salt, or water, allows one way passage of these constituents into the electrolytic unit while prohibiting the escape of chlorine gas or other vapors at the moment of chemical addition. The chemical addition fitting consists of a leur-lock type fitting used to align the addition port to the addition mechanism containing the chemicals of interest with the addition fitting containing a spring loaded check valve to allow only one way passage of materials. This unprecedented means of chemical maintenance optimizes the safety and consumer health associated with the operation of an economically beneficial mode of on-site chlorine generation.

The specific design of this open-cell electrolytic swimming pool chlorine gas generator utilizing electrolyte buffering reagents incorporating the components of an open-cell, an electrolyte buffer, the use of buffering chemistry in an electrolytic cell aimed at neutralizing hydroxides, the use of buffering compounds to solublize other buffers, a simplified injection system, a gas separating plate, a cooling circuit, specially designed rectangular horizontal electrodes, and a unique chemical addition fitting culminates in a novel apparatus for the electrolytic generation of chlorine gas. This apparatus establishes a new basis of safe, trouble free, economic generation of chlorine gas for swimming pool application.

Various other objects, advantages, and features of the present invention will become readily apparent from the ensuing detailed description, and the novel features will be particularly pointed out in the appended claims.

BRIEF DESCRIPTION OF THE DRAWINGS

FIG. 1 is a front sectional view taken along line I—I of FIG. 3, showing an open-cell chlorine generator embodying the present invention;

FIG. 2 is a rear elevational view, with portions broken away, of the chlorine generator;

FIG. 3 is a side elevational view taken along lines III—III of FIG. 2, of the chlorine generator; and FIG. 4 is a side view in section, showing a chemical addition fitting according to the present invention.

DESCRIPTION OF THE PREFERRED EMBODIMENTS

While the preferred embodiment of an open-cell electrolytic gas chlorinator using electrolyte buffering reagents is discussed herein with regard to use in swimming pools, it should be expressly understood that the device according to the present invention is in no way viewed as so limited in application. Other applications to which the present invention could be advantageously employed include but are not limited to: potable water systems, cooling towers, extraction and injection wells, surface water sources, industrial processing streams, water reuse circuits, chemical processing systems, aqueous metallurgical processing streams, plus physiochemical applications where a slightly oxidizing environment is required, or within biomedical uses such as therapy baths for control of microbiologically based, infectious dermatological conditions.

The herein discussed preferred embodiment relates to the incorporation of an open-cell design which does not retain an electrolyte partition placed between the anode and cathode. Essentially, as shown in FIGS. 1 through 3, this open-cell design consists of a container or housing 1 fabricated from materials which are compatible with a humid chlorine environment, eg. such as acrylic polymers, fluoropolymers, or phenylene oxide. The preferred embodiment of the housing consists of a rectangular shaped box with four sides and a bottom, but may be of any shape including cylindrical or rhomboid. The top of the housing or lid 2 can be planar or convex, and is shaped to the design of the housing 1 so that an air tight seal can be maintained between the housing 1 and the ambient environment.

Within the preferred embodiment, the housing 1 is attached to the lid 2 by means of bolts 3, and a seal 4 is formed between the lid 2 and housing 1 by the use of a sealant of appropriate material including but not limited to, silicone sealant, or a gasket constructed of compatible materials, including but not limited to Teflon or a silicone rubber sealant. The housing 1 and lid 2 should be constructed of materials with a strength such that a vacuum or applied pressure not to exceed 10 psig (0.703 kg/cm$^2$) can be tolerated without rupture. The bolts should be constructed out of a material resistant to the corrosive chlorine environment, a 316 grade stainless steel is appropriate.

The buffer(s) utilized within an electrolyte 5 of the open-cell electrolytic chlorine gas generator according to the present invention, are an intricate portion of the design and allow the operation of this novel electrolytic system. The purpose of the buffer(s) is to neutralize the hydroxide which is generated at the cathode concurrently with the generation of chlorine at the anode. The buffers can consist of materials which are water soluble, alkalinely insoluble but acidically soluble, or compounds which are generated by the admixture of water and gasses prior to use in the electrolytic unit. Associated with the buffers' direct purpose in neutralizing generated hydroxide anions, these buffering compounds provide a means to stabilize or buffer the pH of the electrolyte so that the formation of chlorine oxides is circumvented, the precipitation of sparingly soluble salts is inhibited, the longevity of the electrodes is optimized, the evolution of chlorine gas from the electrolyte is maximized, the required service is minimized, and consumer safety in connection with the operation of such a unit is increased.

Within the preferred embodiment of this invention, the buffering reagents or admixture thereof which present the optimum level of efficiency and economy are phosphate based compounds, including but not limited to the acidic inorganic forms of: polyphosphate, pyrophosphate, orthophosphate, hexametaphosphate, tripolyphosphate, or blends of these compounds. Additionally such buffers including but not limited to the organic phosphate acid forms of aminomethylene-triphosphate, ethylenediaminetetraccetate, ethylenediamintetramethylenephosphonate, 1-hydroxyethylidine-1 1-diphosphonate, hexamethylenediaminetetramethylenephosphonate, and diethylenetriaminephentamethylenephosphonate, and their admixture, would be effective buffering additives within the electrolytic chlorine gas generator.

Although not within the preferred embodiment of this application, such compounds as sulfuric acid, nitric acid, hydrochloric acid, oxalic acid, malonic acid, carbonic acid, citric acid, adipic acid, ascorbic acid, DL-aspartic acid, dimethymalic acid, fumaric acid, glutaric acid, itaconic acid, maleic acid, malic acid, mesaconic acid, methylsuccinic acid, succinic acid, tartaric acid, and any other carboxylic acids would produce the desired electrolyte buffering capacity. Other acid forms also would be effective electrolyte additives such as arsenate, chromate, germanate, silicate, tellurate and tetraborate. Other metallic species which generate acidic hydrogen protons or are insoluble as hydroxides when combined with water can also be used as electrolyte additives. These metal additives include salts of actinium, aluminum, bismuth, cadmium, calcium, cobalt, gallium, iron, lanthanum, manganese, platinum, samarium, scandium, zinc, zirconium, and the corresponding oxides of these metals.

The buffering chemistry utilized within the open-cell electrolytic chlorine gas generator is required to avoid the deleterious effects produced by the hydroxide anions which include prohibiting the generation of chlorine gas. For numerous applications where chlorine gas or chlorine gas dissolved in water is required, the generation of hydroxide or caustic solutions is neither required nor desired. The application of the aforementioned buffering chemistry within the electrolyte of the chlorine gas generator avoids the problems associated with the handling of these abrasive caustic solutions, which in most cases are either discharged, undesireably added to the process of interest (the swimming pool, for example), or disposed of in other manners.

In the operation of the open-cell electrolytic gas generator, as in the operation of any chlorine gas generator, a source of chlorides in the electrolyte is required to be oxidized to chlorine gas. Within the preferred embodiment of the application, the source of chlorides designated is sodium chloride, in the form of a dissolved saline solution. Additionally, other sources of chlorides include, (but are not limited to), potassium salt, or other metallic chloride salts such as aluminum or iron.

The present electrolytic cell no longer effectively functions when the concentration of chloride ions in solution falls below 13 grams per liter. The maximum solubility of chloride ions is 150 grams per liter, the amount of chlorides added can range between these two extremes, the initial concentration in the example which follows is approximately 56 grams per liter.

Concurrent with the use of buffers within the saline electrolyte of the open-cell chlorine gas generator, the use of admixtures of buffers will facilitate the solubility of other less soluble buffering reagents. A specific example (and not by way of limitation) of this dissolution within the preferred embodiment is the use of the acid form of orthophosphate to solublize the less soluble acid forms of polyphosphate, pyrophosphate or hexametaphosphate. In general, the addition of a very soluble buffer to a slightly soluble buffer will facilitate the increased solubility. Hence, the admixture of two or more buffers will optimize the effectiveness of the buffering reagents with the electrolyte.

The amount of buffer added is correlated to the length of time desired between servicing the cell. As a rough approximation, 1 gallon of saturated buffer solution will permit 1 month of normal cell operation, before exhaustion of the buffer.

As no interface or admixture between the stream requiring chlorination and the electrolyte is desired, a means of conducting the generated chlorine and hydrogen gasses from the electrolyte to the stream requiring treatment is required. In addition, a physical means of combining the generated gasses and the stream which requires treatment is necessary. A gas conduit and a mixture device are combined in this invention as one, namely the injector 7. The chlorine gas generated at the anode 8 and the hydrogen gas generated at the cathode 9 are conducted via the first and second lengths of tubing 6A and 6B to the injector 7, suitable materials for this gas conductive tubing includes polypropylene and polyethylene.

The injector 7 also receives a stream of untreated solution requiring chlorination from a filter means (not shown) as at 10, which is interfaced with a cooling circuit or coil 11. The injector is set an angle $\theta$ ranging from 0 degrees to 90 degrees, and which $\theta$ facilitates the maximization of surface area of the stream portion to be treated with the volume of generated gasses. The injector 7 receives pressurized water from a previously existing pump means, which, in this preferred embodiment, is the pressurized stream following the swimming pool filtration pump and pool filter. The slightly pressurized stream which requires chlorination is conducted from an inlet 10A, through the cooling coil 11, into the injector 7, past gas phase and liquid phase mixing points adjacent inlets, 7A and 7C, out of the injector 7, and back to the body of water, 12 through an outlet 7D.

The injector 7 retains no internal parts or baffles and consists only of a distance of piping in excess of 4 inches in length, constructed out of materials compatible with chlorine and hydrogen, polyethylene for example, a solution inlet 7B, an inlet 7A for the chlorine gas injection adjacent to the solution inlet 7B, and inlet 7C for the hydrogen gas located preferably at least 4 inches (10.2 cm) from the chlorine gas-solution interface (the hydrogen inlet is optional as being one means for disposing of this added material), and an outlet 7D for return of the treated solution. Materials suitable for its construction include polyvinyl chlorides and fluoropolymers. Along the distance of the tubing 6A and 6B between the lid 2 and the injector 7 there are placed check valves 13, constructed of compatible materials, such as polyvinyl chloride or fluoropolymers in order to facilitate a one way flow of gasses from the electrolyte 5 to the injector 7. These check valves 13 prohibit the flow of solution from the body to be treated into the electrolyte.

In order to retain a desired separation of the chlorine and hydrogen gasses generated from the electrolyte unit evolving from the electrolyte 5 into the gas space 14 above the electrolyte 5, a gas separating plate 15 is placed in the gas spaced and is partially immersed within the electrolyte 5. In this preferred embodiment, the gas separating plate 15 is bonded to the top of the housing 2 with an air tight seal and slides down runners 16A and 16B which are attached to opposite sides of the internal portion of the housing 1 and protrude from the walls of the housing in excess of one quarter inch. The length of the gas separating plate 15 is extended from the top of the housing 2 to just above the electrodes (an anode 8 and cathode 9). The gas separating plate 15 can be constructed of any material which is compatible with an aqueous chlorine environment, any of the materials appropriate for the housing 1 can be used.

The design of the open-cell electrolyte chlorine generator is such that with the applied voltage over the electrodes 8 and 9, required to generate chlorine gas, a certain quantity of the administered potential is consumed by heating the electrolyte 5. The cooling circuit 11 is immersed in the electrolyte 5, and coiled about within the interior of the housing 1 and conducts the stream of water requiring chlorination (used as a heat transfer fluid) from the inlet 10A to the injector 7. This cooling circuit 11 will conduct heat from the electrolyte to the water stream, thus maintaining a relatively constant electrolyte temperature while heating up any stream having an ambient temperature below 85° F. (29.4° C.). This cooling coil 11 within the preferred embodiment can be constructed of any material impervious to the passage or diffusion of water and must be compatible with an aqueous chlorine environment such as polypropylene or polyethylene. This cooling circuit 11 will be sealed at the inlet 10A and at the outlet 7B. Additionally, it can also be attached in an appropriate fashion (not shown) to the interior of the housing 1 to prohibit movement of the cooling circuit 11. With this embodiment, there is no passage of electrolyte into the cooling circuit and indeed there is no addition of any substances from the electrolyte to the stream requiring treatment, except for the addition of the chlorine and hydrogen gasses.

The anode 8 and cathode 9 within this invention are specifically and functionally designed to optimize the generation of chlorine and hydrogen gasses from the electrodes, through the electrolyte 5, and into the open space 14. Although other materials can be used, an anode 8 constructed of carbon graphite, compounded in a manner minimizing deterioration, is preferred. A preferred material for the cathode is a 316 grade of stainless steel. Both the anode 8 and cathode 9 are mounted on individual threaded shafts 17A and 17B which are constructed from an electrically conductive material. Each electrode shaft 17A and 17B is threaded into the electrolyte 8, 9 for support and sealed from the electrolyte 5 using a gasket 18 (see FIG. 3), which surrounds each electrode shaft 17A and 17B and is pressed between the electrode and the housing 1. Each electrode shaft gasket 18 (only one is shown) is constructed of a flexible material compatible with an aqueous chlorine environment such as a silicone sealer or a teflon material. The power source (not shown) is wired directly to each electrode shaft 17A and 17B which in turn facilitates the charging of the electrodes 8 and 9.

The voltage required depends upon the precise design of the cell. The electrolyte production of chlorine requires an applied voltage of between 4 and 5 volts. Depending upon the resistance of the cell as constructed, the voltage supplied to the cell will vary upwardly from this figure. For example, 6.9 volts were supplied to the electrolyte cell set forth in the provided example. The amperage may vary depending upon the rate of chlorine production desired.

The unique design of the electrodes 8 and 9 is based upon the desired attributes to separate the chlorine and hydrogen gasses present in the electrolyte 5 while optimizing the evolution of these gasses from the electrolyte 5. These unique characteristics are obtained by utilizing rectangular electrodes which horizontally project from a side of the housing 1 in a vertical plane, and thus having their surfaces of greatest area parallel to the plane of the gas separating plate 15. The use of such a configuration allows concentration of the gasses at the electrode, with the evolution of gasses from the electrolyte forming a defined stream. It is preferable, but not required within this preferred embodiment to have each electrode be of the same opposing planar size, and thus minimize excessive concentrated wear. For example, the electrodes 8 and 9 could have dimensions of $6\frac{1}{4}$ inches high by 9 inches across in the juxtaposition plane (16 by 23 cm) and have a depth ranging from $\frac{1}{4}$ inches (6.35 cm) to several inches. The depth of each electrode varying with the required longevity of the electrode, the size requirements of the electrode shaft, and the quantity of projected wear.

An additional attribute of incorporating horizontally projecting electrodes is to minimize the undesired oxidation of chlorine gas present at the anode 8 because of the shape of the electrode. The additional oxidation of chlorine gas consumes power and decreases cell efficiency. In the present invention, this is minimized because of the rectangular design placed in a vertical plane, which facilitates the quick removal of gasses from the anode 8. It should be noted that although rectangular electrodes, projecting vertically outward from the lid 2 or the bottom of the housing 1 are not preferred, the vertical mounting will produce similar results, but at a lower level of efficiency.

Concurrent with the operation of the open-cell electrolytic chlorine gas generator utilizing electrolyte buffering reagents, the addition of a chloride source such as sodium chloride, the administration of more buffering compound, or the need for water in the electrolyte make-up may be required. In order to allow the addition of these items which are necessary for proper operation, a safe means of administration is provided in this preferred embodiment, the chemical addition fitting 27 (see FIG. 4). The chemical addition fitting 27 consists of a leur-lock mount 28 to align the administration device with the top of the housing 2 and an internal check valve 29 to allow one-way addition of the necessary chemicals while prohibiting the flow of gasses or electrolyte 5 from the chemical addition fitting 27. The chemical addition fitting 27 can be constructed of materials compatible with an aqueous chlorine environment, such as a fluoropolymer, and can be placed on either side of the gas separating plate 15. Within this preferred embodiment, the chemical addition fitting 27 is placed between the anode 8 and the gas separating plate 15 to maximize the concentration of the chlorides at the anode 8, allow the highest concentration of buffer at the anode 8, and minimize the direct contact between the electrodes 8 and 9 and the administered substances.

The unique design of the open-cell electrolytic chlorine gas generator according to the present invention, is especially useful in a swimming pool application. When the present chlorine generator is so used, only chlorine and hydrogen gasses are added to the pool water, thereby avoiding the further chemical contamination of the water necessary in many of the prior art devices. Furthermore, this result is accomplished without the use of a membrane, and no intermittant withdrawal of an abrasive caustic solution is required because of the neutralization of the generated hydroxide by the buffering chemistry employed.

The following example is provided to aid in the understanding of the present invention, and should not be viewed as limiting the present invention in any respect.

An open-cell electrolytic chlorine generator having outside dimensions 27 inches long by 15 inches high by 12 inches deep (68.6 by 38.1 by 30.5 cm) with an electrolyte capacity of 18.2 gallons (69 liters) was constructed according to the present invention. The buffered electrolyte used consisted initially of 14 gallons (63.6 liters) of water mixed with 11 pounds (5 kg) of pelletized rock salt, of the type marketed by the Morton Salt Division of Morton Norwich, Inc. This saline solution was combined with 3 gallons (13.6 liters) of the acidic form of 115% technical grade polyphosphate (as manufactured and distributed by the FMC Corp.) and ½ gallon (2.3 liters) of the acidic form of 85% technical grade orthophosphate (FMC Corporation or Stauffers, Inc.) to promote the dissolution and increase the solubility of the added constituents. 18.2 gallons (69 liters) of this solution was added to the generator.

The direct current utilized was obtained using a rectifier powered from a standard, alternating current wall outlet of 115 volts and several amperes. The rectifier was pre-set to administer a current of ten (10) amperes at a voltage of 6.9 volts to the electrodes. The electrodes consisted of an anode of extruded carbon graphite (AGLR-58 type, Union Carbide), and a cathode of 316 grade stainless steel. They both had initial dimensions of 9 by 6¼ inches (22.9 by 15.9 cm), with a thickness of 1.25 inches (3.18 cm) for the graphite anode and a thickness of ⅛ inches (0.32 cm) for the stainless steel cathode.

The consumption of alternating current by the rectifier was 0.6 amperes at a voltage of 118 volts. With an alternating current power consumption of 75 watts, the rectifier applied a direct current across the electrodes, immersed within the electrolyte, of 10 amperes at 6.9 volts. This current resulted in a chlorine gas generation rate of 3.52 grams per hour. Thus, the power consumption required to produce a pound of chlorine gas at this rate is $0.29, assuming a standard power cost of $0.03 per kilowatt hour.

Varying the applied amperage demonstrated a directly proportional (linear) relationship between the amperage applied and the rate of chlorine gas generation. At an applied amperage of 20 amperes, with the same, above specified electrolyte formulation, the chlorine gas generator produced 7.0 grams per hour of chlorine gas, again at a cost of $0.29 per pound of chlorine gas.

The present invention as embodied in the electrolyte buffer, gas separating plate, electrode design, and the optional cooling circuit, all make possible the continuous, economic operation of the inventive chlorine gas generator. The gas injector and chemical addition fitting permit the segregation of the chemicals used in the chlorine generator from the water to be treated, with only the resultant chlorine and hydrogen gasses added to the water. Thus, the present invention provides an innovative chlorine gas generator permitting a new, technical operating basis for swimming pool chlorine gas generation systems, and other systems having a similar need for chlorine gas.

While I have disclosed an exemplary structure to illustrate the principles of the invention, it should be understood that I wish to embody within the scope of the patent warranted hereon all such modifications as reasonably and properly come within the scope of my contribution to the art.

I claim as my invention:

1. An open-cell electrolytic chlorine gas generator comprising:
    a housing forming a sealed container adapted to contain an electrolyte within said housing which comprises:
        a chloride-containing solution, and
        a buffer for the solution;
    a pair of substantially planar electrodes attached to the housing and projecting into the electrolyte, said pair of electrodes are attached to and project inwardly from a side of said housing, with the surfaces of said electrodes having the largest surface area disposed in vertical planes;
    a gas separating plate forming a sealed relationship to a lid of said housing and projecting downwardly into the electrolyte in a vertical plane located between and substantially parallel to the vertical planes of said pair of electrodes, to a depth directly above the electrodes;
    a means for the addition of chemicals into said housing; and
    a means for conducting the gases produced within said housing, from the sealed container,
whereby when a current is passed between the electrodes, the gases produced by each electrode remain separated and may be selectively removed from the housing.

2. An open-cell electrolytic chlorine gas generator comprising:
    a housing forming a sealed container adapted to contain an electrolyte within said housing which comprises:
        a chloride-containing solution, and
        a buffer for the solution;
    a pair of substantially planar electrodes attached to the housing and projecting into the electrolyte;
    a gas separating plate forming a sealed relationship to a lid of said housing and projecting downwardly into the electrolyte in a vertical plane located between said pair of electrodes, to a depth directly above the electrodes;

a means for the addition of chemicals into said housing which comprises:
- a leur-lock mount attached to the lid of said housing, to align an administration device with the top of the the housing, and
- an internal check valve seated in said mount to allow the one-way addition of chemicals while prohibiting the outflow of gases or electrolyte from inside of said housing, and
- a means for conducting the gases produced within said housing, from the sealed container, whereby when a current is passed between the electrodes, the gases produced by each electrode remain separated and may be selectively removed from the housing.

3. An open-cell electrolytic chlorine gas generator comprising:
- a housing forming a sealed container adapted to contain an electrolyte within said housing which comprises:
  - a chloride-containing solution, and
  - a buffer for the solution;
- a pair of substantially planar electrodes attached to the housing and projecting into the electrolyte;
- a gas separating plate forming a sealed relationship to a lid of said housing and projecting downwardly into the electrolyte in a vertical plane located between said pair of electrodes, to a depth directly above the electrodes;
- a means for the addition of chemicals into said housing; and
- a means for conducting the gases produced within said housing, from the sealed container which comprises:
  - a first and second length of tubing, the first length of tubing attached to the lid of said housing on one side of the gas separating plate, the second length of tubing attached to the lid of said housing on the other side of the gas separating plate, and both lengths equipped with check valves which only permit the flow of gas from the sealed container, said first length of tubing is attached to the lid on the side of the gas separating plate containing the anode electrode; and
  - an injector attached to said tubing, which comprises:
    - a length of piping;
    - a solution inlet in said piping to receive the solution to be chlorinated;
    - a chlorine gas inlet in said piping to receive the first length of tubing from the housing; and
    - an outlet located downstream of said inlets for the return of the chlorinated solution, whereby when a current is passed between the electrodes, the gases produced by each electrode remain separated and may be selectively removed from the housing.

4. A chlorine gas generator as described in claim 3, wherein said injector is attached to said housing, and is rotated at an angle $\theta$ from the horizontal.

5. A chlorine gas generator as described in claim 4, wherein said angle $\theta$ is between 0 and 90 degrees.

6. An injector as described in claim 3, and further comprising:
- a hydrogen gas inlet in said piping to receive the second length of tubing from the housing.

7. An injector as described in claim 6, wherein said hydrogen gas inlet is located at least 4 inches downstream of the chlorine gas-solution interface.

8. In an improved open-cell electrolytic chlorine gas generator of the type consisting of a housing filled with a chloride-containing solution with a pair of electrodes immersed in the solution to generate chlorine gas upon the passage of a direct current between the electrodes and through the solution, wherein the improvements comprise:
- said pair of electrodes are rectangular in shape, and are attached to and project inwardly from a side of the housing, with the large, planar surfaces of said electrodes located in substantially vertical planes;
- a gas separating plate attached to a lid of the housing and extending downwardly into the buffered, chloride-containing electrolyte to a depth directly above the electrodes, whereby the gasses generated at each electrode remain separated from one another as they rise to the lid of the housing, and the formation of a free, caustic hydroxide is impeded by the buffer.

9. A chlorine gas generator as described in claim 8, wherein the buffer for the chloride-containing solution is a phosphate based compound.

10. A chlorine gas generator as described in claim 9, wherein the buffer is an inorganic acidic form of at least one of the phosphate based compounds selected from the group consisting of: polyphosphate, pyrophosphate, orthophosphate, hexametaphosphate, and tripolyphosphate.

11. A chlorine gas generator as described in claim 9, wherein the buffer is an organic phosphate acid form of at least one of the phosphate based compounds selected from the group consisting of: aminomethylene-triphosphate, ethylenediaminetetraccetate, ethylenediaminetetramethylenephosphate, 1-hydroxyethylidine-1, 1-diphosphonate, hexamethylenediaminetetramethylenephosphonate, and diethylenetriaminephentamethylenephosphonate.

12. A chlorine gas generator as described in claim 8, wherein the buffer for the chloride-containing solution is an acid.

13. A chlorine gas generator as described in claim 12, wherein the buffer is an acid selected from the group consisting of a sulfuric acid, nitric acid, and hydrochloric acid.

14. A chlorine gas generator as described in claim 12, wherein the buffer for the chlorine-containing solution is a carboxylic acid.

15. A chlorine gas generator as described in claim 12, wherein the buffer is an acid selected from the group consisting of oxalic acid, malonic acid, carbonic acid, citric acid, adipic acid, ascorbic acid, DL-aspartic acid, dimethylmalic acid, fumaric acid, glutaric acid, itaconic acid, maleic acid, malic acid, mesaconic acid, methylsuccinic acid, succinic acid, and tartaric acid.

16. A chlorine gas generator as described in claim 12, wherein the buffer is an acid form of the oxides selected from the group consisting of arsenate, chromate, germanate, silicate, tellurate and tetraborate.

17. A chlorine gas generator as described in claim 8, wherein the buffer for the chloride-containing solution is a metallic salt which, when dissolved in the chloride-containing solution generates acidic hydrogen protons.

18. A chlorine gas generator as described in claim 17, wherein the buffer is a metallic salt selected from the group consisting of: actinium, aluminum, bismuth, cadmium, calcium, cobalt, gallium, iron, lanthanum, manganese, platinum, samarium, scandium, zinc, and zirconium.

19. A chlorine gas generator as described in claim 8, wherein the buffer for the chloride-containing solution is a metallic salt which, when dissolved in the chloride-containing solution, combines with the hydroxides to form insoluble salts.

20. A chlorine gas generator as described in claim 19, wherein the buffer is a metallic oxide selected from the group consisting of: actinium, aluminum, bismuth, cadmium, calcium, cobalt, gallium, iron, lanthanum, manganese, platinum, samarium, scandium, zinc, and zirconium.

21. The method for generating chlorine gas in situ for water treatment at a point of utilization which includes the steps,
  (1) confining a supply of chloride solution in a sealed container;
  (2) selectively adding a buffering agent into the container to admix with the chloride to form a buffered chloride solution;
  (3) electrolytically oxidizing chlorine ions by electrolysis of the buffered chloride solution;
  (4) selectively removing chlorine gas from the container; and
  (5) admixing the chlorine gas with the water under treatment.

* * * * *